US007039685B2

(12) United States Patent
Halcomb et al.

(10) Patent No.: US 7,039,685 B2
(45) Date of Patent: May 2, 2006

(54) METHOD AND APPARATUS FOR CONDUCTING SUBSCRIBER'S PHONE TESTING REMOTELY VIA THE INTERNET

(75) Inventors: Herbert Wayne Halcomb, Naperville, IL (US); Marlon Zbigniew Kasprzyk, Winfield, IL (US); John Michael Kyser, Westmont, IL (US); Zbigniew Pancerz, Arlington Heights, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 634 days.

(21) Appl. No.: 09/862,140

(22) Filed: May 21, 2001

(65) Prior Publication Data

US 2002/0174210 A1 Nov. 21, 2002

(51) Int. Cl.
*G06F 15/16* (2006.01)

(52) U.S. Cl. .................. 709/217; 379/10.01; 379/19; 379/21; 379/22.03; 379/22.07; 379/26.01; 379/27.01; 379/27.03; 379/27.04; 379/29.01; 379/29.02; 379/29.11; 379/331; 379/381; 379/397; 379/1.01; 455/67.11; 455/67.14; 455/115.2; 455/422.1; 455/423; 455/426.1; 348/189; 348/192; 348/552; 725/107; 714/712

(58) Field of Classification Search ............... 455/424, 455/423, 422.1, 426.1, 67.11, 67.14, 115.2; 709/217, 218, 219, 223; 379/1.01, 10.01, 379/19, 21, 22.03, 22.07, 26.01, 27.01, 27.03, 379/27.04, 29.01, 29.02, 29.11, 397, 331, 379/381; 725/107; 710/316; 714/712; 340/514; 348/189, 192, 552; 370/241, 271

See application file for complete search history.

(56) References Cited

U.S. PATENT DOCUMENTS

| 5,005,197 | A | * | 4/1991 | Parsons et al. | ............... 379/21 |
| 5,384,822 | A | * | 1/1995 | Brown et al. | ............ 379/15.01 |
| 5,623,498 | A | * | 4/1997 | Pannone | ..................... 714/712 |
| 5,793,646 | A | * | 8/1998 | Hibberd et al. | ............. 700/276 |
| 5,875,398 | A | * | 2/1999 | Snapp | ........................ 455/424 |

* cited by examiner

*Primary Examiner*—John Follansbee
*Assistant Examiner*—Ashok B. Patel

(57) ABSTRACT

An apparatus for and method of remotely controlling electronic devices, such as telecommunication equipment attached to telephone lines, test equipment, and/or home electronics includes a master board (105) having its own IP address and arranged and constructed to receive (401) instructions via the internet (103) from a remote terminal (101). The instructions are interpreted and converted into one or more commands that are directed (405) to a slave board (113 or 117) that performs, in response to the command(s), one or more operations on a telephone line and its associated hardware and/or software (115), a piece of test equipment (125), lights (123), or other type of electronic device. Any results of the operations may be returned to the terminal (101).

14 Claims, 3 Drawing Sheets

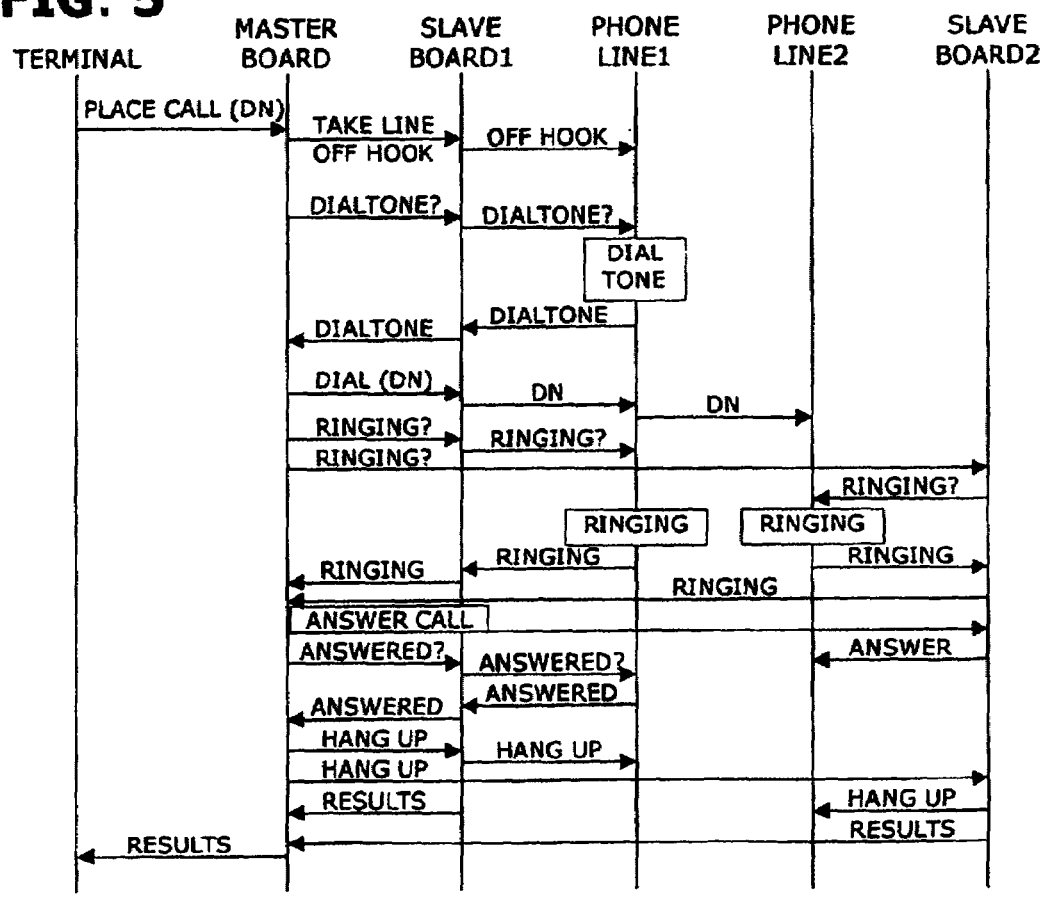

METHOD AND APPARATUS FOR CONDUCTING SUBSCRIBER'S PHONE TESTING REMOTELY VIA THE INTERNET

FIELD OF THE INVENTION

This invention relates to remote control, including but not limited to remote control of electronic devices, including telecommunication equipment, via the internet.

BACKGROUND OF THE INVENTION

Communication equipment is often tested in large laboratories in various places often around the world. Each time software and/or hardware features are modified, these features are tested rigorously prior to being delivered to a customer. These test procedures often involve use of a lab technician to dial a telephone number and/or pick up the called phone when it rings. It is often desirable to perform such testing during off-peak hours, when traffic on telephone lines is typically least, e.g., about 1:00 a.m. to 7:00 a.m. During this time period, however, it may be very expensive, if not difficult, to obtain laboratory assistance during such hours. In addition, operators introduce human error into the testing process, such as misdialing a number, failing to hang up a phone correctly, or other errors that may otherwise increase testing time.

Remote testing capabilities exist today. Nevertheless, these capabilities are limited to applications in the same room as the device under test and do not have the capability to test, for example, hardware that connects to phone lines and the software that controls the lines.

Accordingly, there is a need for a method to remotely test and generally to test telecommunication equipment without need for an operator to be present.

SUMMARY

A method comprises the steps of receiving an instruction from a terminal via an internet connection and, in response to the instruction, issuing a command to at least one slave board to perform at least one operation on at least one telephone line. An apparatus for executing the method is also described.

BRIEF DESCRIPTION OF THE DRAWINGS

FIG. 5 is a timing diagram showing an example of a master board interfacing with slave boards to place a phone call in accordance with the invention.

DESCRIPTION OF A PREFERRED EMBODIMENT

The following describes an apparatus for and method of remotely controlling electronic devices, such as telecommunication equipment attached to telephone lines, test equipment, and/or home electronics. A master board with its own IP (internet protocol) address receives instructions via the internet from a remote terminal. The instructions are interpreted and converted into one or more commands that are directed to a slave board that performs, in response to the command(s), one or more operations on a telephone line and its associated hardware and/or software, a piece of test equipment, lights, or other type of electronic device. Any results of the operations may be returned to the terminal.

Figure 1:
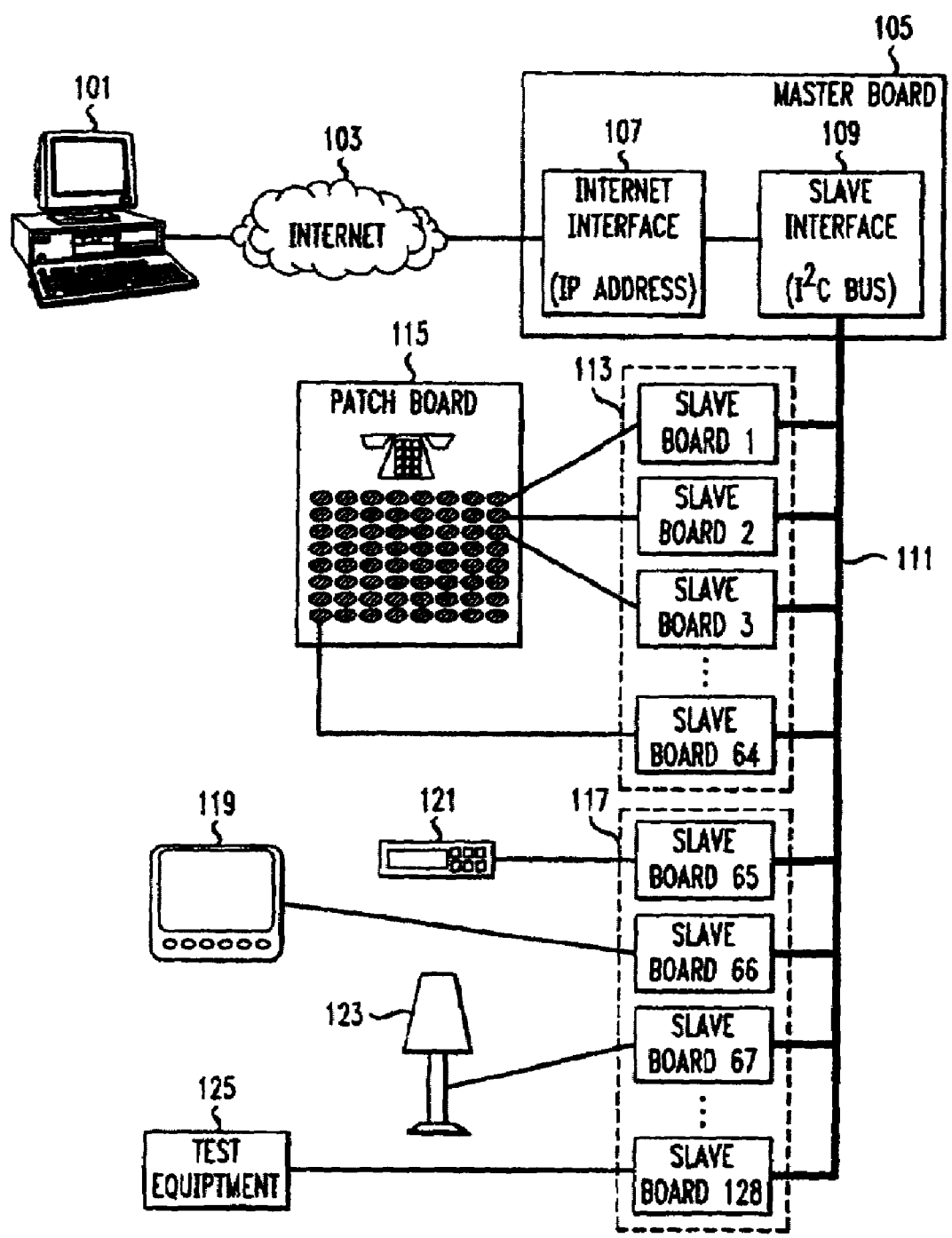
FIG. 1 is a block diagram of a remote control system in accordance with the invention.

A block diagram of a remote test system for testing phone lines is shown in FIG. 1. A remote user utilizes a terminal 101 that has an internet, or intranet, connection and enters commands on the terminal that are relayed to a master board 105 that has its own unique IP (internet protocol) address. The master board 105 receives instructions from the terminal 101 via the internet/intranet 103 and interprets, processes, and appropriately converts these instructions into one or more commands that are addressed and sent to one or more appropriate slave boards 113 or 117 via a bus 109. The bus may be an I$^2$C bus that supports up to 128 addresses, as known in the art. Each slave board 113 is connected to one or more phone user-selectable jacks, such as RJ45 jacks, that are part of a patch board 115 (only one is shown in FIG. 1 for the sake of simplicity of the drawing). Each jack is connected to a telephone line that is part of a communication system, including hardware and software, being tested. Performing an operation on the a telephone line includes operations performed on and/or related to the telephone line and/or any hardware and/or software associated with the telephone line. Testing a telephone line includes testing the telephone line and/or any hardware and/or software associated with the telephone line.

The user of the terminal 101 may also issue instructions via the internet, or intranet, 103 to direct the master board 105 to give commands to one or more slave boards 117 that are each connected to an electronic device 119, 121, 123, or 125. The electronic devices may include, for example, a television 119, a VCR 121, lights 123, and various pieces of test equipment 125. The system provides a user with remote access to electronic devices from wherever the user may be, as long as there is internet access. The user may control electronic devices from home, such as the television, lights, the VCR, including programming the VCR, for example, if it is desirable to give the appearance that the person is home, to record a program on the VCR 121, to start a coffee pot for fresh coffee when arriving home, to preheat an oven or jacuzzi, and so forth. The control may also be provided on a timed basis, and commands may be provided to, for example, turn on lights 123 or air conditioning a few minutes prior to a person coming home rather than wasting energy while the remote user is not home. An operation may be performed on a particular device for a specified time period, e.g., tying up a phone line during a particular time to give the appearance that one is at a particular location.

Such a system provides the cability to operate one or more pieces of test equipment and telecommunications equipment, including hardware and software, remotely. If a test engineer is in one place, and the device that is desired to be tested is in another more remote place, such as another city, state, or country, the test engineer may operate the device from any computer that has internet access. The test engineer may desire to run tests from home, perhaps overnight or on the weekend, without having to come into the office. Complicated test equipment may be programmed, fed data, powered on, powered off, and have other types of operations performed on it. Two or more pieces of equipment may be tested in one battery of tests, and similar tests may be performed at the same time on multiple pieces of similar equipment. If, for example, in FIG. 1, all 128 slave boards are connected to telephone jacks, 64 separate phone calls may be placed at one time to test a particular hardware or software feature in mind, thereby making testing 64 times faster. When each slave board 113 is set up to support 2 or more lines each, the system will be able to support 2 or more times as many phone calls. This is a distinct advantage provided by the present invention, because a single person cannot simultaneously nor as accurately place 64 simultaneous phone calls. Thus, telecommuting is more realizable for certain types of jobs that may otherwise require a physical presence of a person.

The master board 105 has a unique internet address as well as hardware and software 107 to interface with the internet/intranet 103, including web server applications appropriate to receive the remote instructions over the internet/intranet 103, such as a web browser or other internet-aware application. The internet interface 107 receives instructions and in response issues appropriate commands through a slave interface 109 that has a bus interface, such as an I$^2$C interface, as known in the art. The master board 105 provides appropriate control for the slave boards 113 and 117 to control the devices connected to the boards. The bus interface 109 has the appropriate hardware and software to drive the hardware and software on the slave boards 113 and 117 associated with the master board 105. The bus interface 109 may be a standard I$^2$C interface capable of supporting 128 addresses (i.e., 128 slave boards), an expanded I$^2$C interface capable of supporting more than 128 addresses, or another type of bus interface.

The master board 105 provides an Ethernet and/or RS232 connection. The master board 105 serves as a messenger between the remote user and the slave board(s) 113 or 117. The remote user connects with the master board 105 via, for example, a 10BASE-T (IEEE 802.3) interface and/or RS232 port on the master board 105. The master board 105 may, for example, interpret serial data from the RS232 or Ethernet port and recognize and send commands in I$^2$C format to the slave cards 113 and 117. The master board 105 may receive data from the slaves 113 and 117 over the I$^2$C bus and sends the data serially over the RS232 or Ethernet port back to the remote user. The master board 105 may have a CPLD (Complex Programmable Logic Device), such as a Lattice 2128 CPLD, to provide general purpose input/output and perform various logic and/or clock functions. The master board 105 may have an EEPROM that stores various information, such as the slave card 113 and 117 addresses and directory numbers ("phone number") for the telephone lines associated with the slave cards 113. The master board 105 and slave boards 113 and 117 may have devices such a 16×4 LCD (Liquid Crystal Display) and various monitoring devices, such as a National LM 76 temperature monitor, voltage meter, ammeter, and so forth. The master board 105 may be used to log information exchanged between the slaves and the remote user, which information may be used to completely automate (by repeated the logged commands) a test.

Each slave board 113 or 117 receives data/commands via the bus from the master board 105. Each slave board 113 or 117 has its own unique address on the bus 111 within each individual system attached to a master board 105. The slave boards 113 receive and execute commands that may are related to utilizing a telephone, such as taking a line off-hook, detecting dial tone, dialing a string of one or more digits (such as dialing a directory number or pushing a speed dial button), detecting ringing, answering a call, hanging up on a call, and so forth. The slave boards 113 may report information on its operations to the master board 105. For example, the slave boards 113 may report whether dial tone is detected, report whether a ring is "heard," taking a line off-hook (e.g., answering a call), interpret and report digits associated with DTMF (Dual Tone Multi-Frequency) tones, detect line conditions (such as on-hook and off-hook), and put a line on-hook or hang it up. For example, the slave boards 117 may report the status of electronic devices (such as temperature, power, voltage, current), exchange data generated for and by the electronic devices 119, 121, 123, and 125, read status of the electronic devices 119, 121, 123, and 125, and perform other relevant tasks related to the electronic devices 119, 121, 123, and 125.

The slave boards 113 or 117 may operate as stand-alone units, i.e., without a master board 105. When acting as a stand-alone unit, the slave 113 or 117 may act as a receiver capable of detecting an incoming ring signal, taking a line off-hook, and detecting, decoding, and transmitting DTMF tones, for example, to control devices such as relays connected to the slave card 113 or 117 for purposes of remote control.

The slave boards 113 of FIG. 1 provide an analog or digital telephone interface that performs the functions of a typical telephone, as well as interfaces that send/receive control signals, detect conditions, and/or exchange data with the telephone lines and the master board 105. The slave boards 113 may perform operations such as detecting at least one condition of a telephone line, detecting an on-hook condition on the telephone line, detecting an off-hook condition on the telephone line, detecting a ringing on the telephone line, detecting dial tone on the telephone line, placing a call on the telephone line, answering a call directed to the telephone line, placing the telephone line on-hook, and taking the telephone line off-hook. The slave boards 113 that drive telephone lines may have on board features such as loop current and ring detector, DTMF detectors and transmitters, and may communicate with the other slave boards as necessary.

The slave boards 117 that drive electronic devices provide an appropriate interface within an electronic device, such as relays for turning on and off objects and interfaces that program devices, send/receive control signals, and/or exchange data with the electronic device 119, 121, 123, or 125 and the master board 105. The slave boards 117 may perform operations such as detecting at least one condition of the at least one electronic device, powering on the at least one electronic device, powering off the at least one electronic device, programming the at least one electronic device. The slave boards 117 may report information on its operations to the master board 105.

Although FIG. 1 shows an example where 64 slave boards 113 are connected to telephone jacks and the next 64 slave boards 117 are connected to electronic devices, the slave boards 113 and 117 may be connected to any number of telephone jacks 115 from 0 to 128 and any number of electronic devices 119, 121, 123, and 125 from 0 to 128, as long as there are no more that 128 total slave boards. The order of the slave boards 113 and 117 is not important as long as the master board 105 knows the address of the board and what devices are operated by each board 113 or 117.

Figure 2:
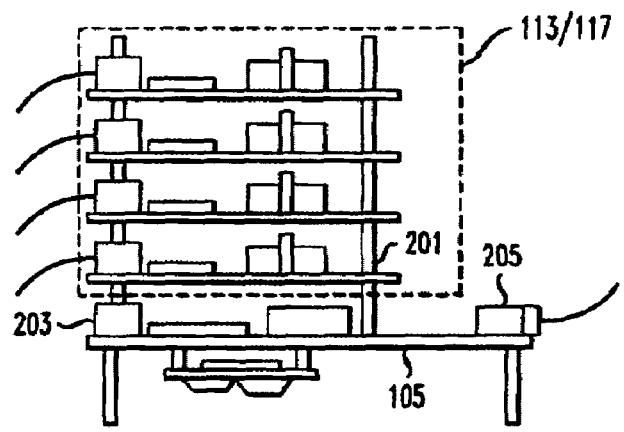
FIG. 2 is a diagram illustrating a master board piggy-backed to multiple slave boards in accordance with the invention.

A diagram illustrating a master board 105 piggybacked to multiple slave boards 113 or 117 is shown in FIG. 2. Each slave board 113 or 117 is typically identical, with a connector attached above each slave board 113 or 117 and its mate attached below each slave board 113 or 117, such that the boards plug into each other through these connectors 201.

The master board 105, having an internet connector 205, has a connector 201 that mates with an adjacent slave board 113 or 205. These connectors 201 serve to provide the bus 111 between the boards 105, 113, and 117. Connectors 203 between the board may be utilized to support the space between the boards 113 and 117 and may additionally contain the connectors to the devices 115, 119, 121, 123, and 125 operated by the slave boards 113 and 117. Thus, the present invention may be very compact physically. Although the I²C protocol as defined is capable of supporting up to 128 slave boards, multiple master boards or an expanded bus may be implemented to control and operate more than 128 slave boards per master board.

Figure 3:
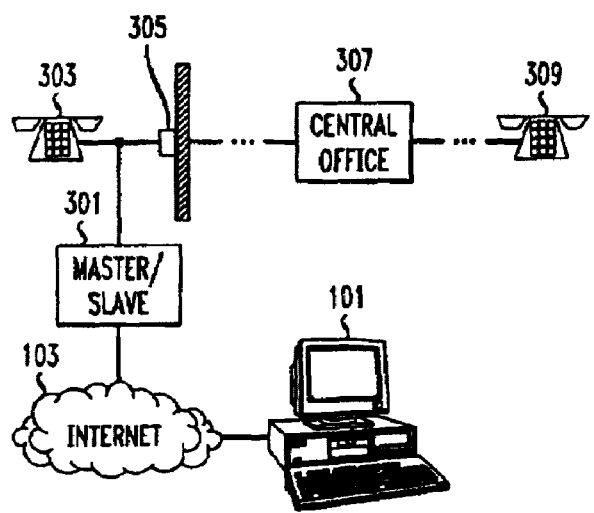
FIG. 3 is a block diagram of an application of a remote control system for operating electronic devices in accordance with the invention.

A block diagram of an application of a remote control system for operating electronic devices is shown in FIG. 3. A remote user at a remote terminal 101 accesses a master/slave unit 301 via the internet. In this example, the master/slave unit may comprise a single master card 105 and a single slave card 113 that is connected to a telephone line associated with a first telephone 303 plugged into a jack 305, such as an RJ45 jack. The master/slave unit 301 may also be connected to an electronic device at the location of the telephone 303, such as a light 123 or television 121 (not shown in FIG. 3). The telephone 303 is connected to normal telephone service (such as provided by the public switched telephone network) through a central office 307. The remote user may instruct the master/slave unit 301 to call a second telephone 309. The call placed by the remote user will appear to be placed by the first phone 303 in the perspective of the user of the second telephone 309 and the central office 307. This set-up may be useful, for example, to test the hardware and software necessary to place a call between the two phones 303 and 309. Instead of the phones 303 and 309, patch boards containing multiple phone jacks may be utilized and multiple calls may be directed between them simultaneously. The user may be located in the United States, and the master/slave unit 301 and the devices 303 and 309 may be located, for example, in Europe. The remote user may take advantage of the time difference between the locations to place phone calls during off-peak hours in other time zones. The remote user may also wish to utilize the invention to work from home overnight or on weekends without physically having to go into the office.

Figure 4:
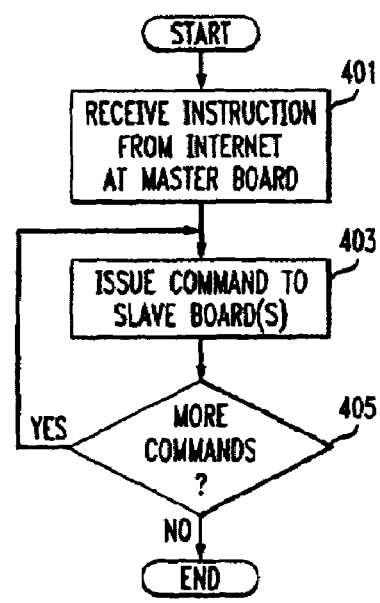
FIG. 4 is a flowchart of a master-slave combination method in accordance with the invention.

A flowchart of a master-slave combination method is shown in FIG. 4. At step 401, an instruction issued by the terminal 101 is received via the internet at the master board 105. The master board 105 interprets and converts the instruction into one or more commands 405 that are issued at step 403 to one or more slave board(s) 113 or 117. The user may select the slave boards based on telephone line or electronic device attached to the slave board 113 or 117. The master board 105 has a mapping of telephone numbers or electronic devices for each slave board associated with an address, such as a 7-bit I²C address.

A timing diagram showing an example of a master board 105 interfacing with slave boards 113 to place a phone call is shown in FIG. 5. The remote terminal 101 issues an instruction to the master board 105 via the internet 103 to place a call. This instruction includes a directory number (DN). The master board 105 receives this instruction and issues a command to the appropriate slave board 113 (slave board 1) to take its telephone line (line 1) off hook. The slave board 113 then takes its line off hook. The master board 105 issues a command to the slave board 113 to detect dial tone. The slave board 113 enters its dial tone detection routine, and when it detects dial tone on the phone line, issues a response to the master board 105 indicating that dial tone is detected. The master board 105 issues a command to the slave board 113 to dial the directory number DN. The slave board 113 dials the directory number on its line. The master board 105 issues a command to the slave board 113 to detect ringing on its line. The slave board 113 enters its ring detect routine, and upon detecting ringing, sends a message to the master board 105 that ringing is detected. In a similar time frame, the master board 105 issues a command to a second slave board 113 (slave board 2) to detect ringing on its telephone line (line 2). Alternatively, the slave board 113 may be programmed to automatically detect a ring and report the results without instruction from the master board 105. The second slave board 113 enters its ring detect routine, and upon detecting ringing, sends a message to the master board 105 that ringing is detected.

Once the master board 105 has received ringing detection indications from both boards, the master board 105 issues a command to the second slave board 113 to answer the call and issues a command to the first board 113 to determine if the call has been answered. Alternatively, the slave board 113 may be programmed to automatically determine if the call has been answered and report the results without instruction from the master board 105. The second slave board 113 answers the call while the first slave board 113 enters its answer detect mode, i.e., off-hook detection. Alternatively, the slave board 113 may be programmed to automatically answer the call and report the results without instruction from the master board 105. When the call is answered by the second slave board 113 and the answering is detected by the first slave board 113, the first slave board 113 indicates to the master board 105 that the call has been answered. The master board 105 then issues a command to each slave board 113 to hang up the line. Each board 113 returns any results from the process to the master board 105, which forwards these results and any results it has performed to the remote terminal 101.

The signals and operations shown in FIG. 5 do not necessarily take place in accordance with the proportions of time shown in the figure. For example, the commands issued to boards to check for ringing or to hang up the call may be substantially simultaneously issued. The results may be sent closely in time, or may be sent some time apart.

The present invention provides the capability to test or operate devices such as telephone lines, test equipment, or home electronics, from a computer with basic internet access. The test engineer may test devices anywhere in the world from an internet connected device. Test laboratories may be physically located anywhere in the world. Off-peak traffic time may be accessed during normal business hours from a terminal in a different time zone. Human error in dialing calls or otherwise operating test equipment is removed, and the ability to decrease testing time by simultaneously testing on multiple pieces of equipment is provided. Cost saving by using local access numbers for internet dial-up rather than costly lost distance charges or expensive time slots on a dedicated T1 line. The present invention provides the ability to gain the appearance of physical presence at a telephone jack location or other device without actually having to be there. The present invention makes telecommuting a reality for many types of jobs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   slave boards,
   a patch board containing a plurality of jacks each connected to a corresponding telephone line;
   cables each having one end connected to one slave board and the other end terminated at one of the jacks of the patch board;
   each slave board is arranged and constructed to receive commands and perform at least one operation on the telephone line to which it is coupled via the cable and patch board;
   a master board; connected to the slave boards by a local data bus, the master board coupled to a remote terminal via an internet connection, wherein the master board is arranged and constructed to receive instructions from the terminal by the internet connection and issue the commands to the slave boards by the local data bus in order to prompt the et slave boards to perform the at least one operation on the connected telephone line;
   the slave boards being arranged and constructed to receive at least one result of the at least one operation and transmit a message containing the one result to the master board, the master board in turn transmits the message containing the one result by the internet connection to the terminal.

2. The apparatus of claim 1, wherein the at least one operation comprises any of the following operations: detecting at least one condition of one telephone line, detecting an on-hook condition on one telephone line, detecting an off-hook condition on one telephone line, detecting a ringing on one telephone line, detecting dial tone on one telephone line, placing a call on one telephone line, answering a call directed to one telephone line, placing one telephone line on-hook, and taking one telephone line off-hook.

3. The apparatus of claim 1 further comprising memory on the master board for storing a plurality of report results received from the slave board in a single report, the master board transmitting the single report to the terminal.

4. The apparatus of claim 1 wherein the master board comprises an internet interface module adapted for communications with the internet connection, and a slave interface module adapted for communications with the internet interface and for communications with the local data bus.

5. A method comprising the steps of:
   receiving at a muter board an instruction from a terminal via an internet connection;
   in response to the instruction, issuing a command from the master board by a local data bus to one of a plurality of slave boards to perform at least one operation on the connected telephone line;
   the one slave board being connected by a cable having one end connected to the one slave board and the other end terminated at one of a plurality of jacks on a patch board where each jack on the patch board is connected to a corresponding telephone line;
   receiving at the at least one slave board at least one result of the at least one operation on the at least one electronic device, and transmitting a message containing the result to the master board by the local data bus.

6. The method of claim 5, wherein the at least one operation comprises any of the following operations: detecting at least one condition of the telephone line, detecting an on-hook condition on the telephone line, detecting an off-hook condition on the telephone line, detecting a ringing on the telephone line, detecting dial tone on the telephone line, placing a call on the telephone line, answering a call directed to the telephone line, placing the telephone line on-hook, and taking the telephone line off-hook.

7. The method of claim 1, further comprising the step of forwarding from the master board via the internet connection the at least one result to the terminal.

8. The method of claim 1, further comprising the step of, in response to the instruction, issuing a command to at least one slave board to perform at least one operation on at least one electronic device.

9. The method of claim 8, wherein the at least one operation comprises any of the following operations: detecting at least one condition of the at least one electronic device, powering on the at least one electronic device, powering off the at least one electronic device, programming the at least one electronic device, and, when the at least one electronic device is a telephone line, placing a call on the telephonic device.

10. The method of claim 5 wherein the step of receiving includes receiving at the master board, from a terminal via an internet connection, an instruction to place a phone call to a directory number; and wherein the step of issuing includes issuing from the master board by the local data bus to at least one slave board, a command to place a phone call to the directory number from a telephone line operably coupled to the slave board.

11. The method of claim 10, wherein the command instructs the slave board to do one of the following operations: take the telephone line off-hook; test the telephone line for dial tone; dial the directory number when dial tone is present on the telephone line; test for ringing on the telephone line; test for an off-hook condition on the telephone line; hang up the telephone line.

12. The method of claim 10, wherein the command instructs the slave board to report results from placement of the phone call to the master board.

13. The method of claim 12 further comprising storing in memory on the master board a plurality of report results in a single report and transmitting from the master board by the internet connection to the terminal the single report.

14. The method of claim 12 further comprising storing information exchanged between the terminal and the slave boards.

* * * * *